United States Patent
Chan et al.

(10) Patent No.: US 11,269,327 B2
(45) Date of Patent: Mar. 8, 2022

(54) PICKING UP AND DROPPING OFF PASSENGERS AT AN AIRPORT USING AN AUTONOMOUS VEHICLE

(71) Applicant: Ford Global Technologies, LLC, Dearborn, MI (US)

(72) Inventors: Lindsay Chan, Dearborn, MI (US); Aysha Habbaba, Dearborn, MI (US); Jinesh J. Jain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 16/476,706

(22) PCT Filed: Jan. 10, 2017

(86) PCT No.: PCT/US2017/012876
§ 371 (c)(1),
(2) Date: Jul. 9, 2019

(87) PCT Pub. No.: WO2018/132088
PCT Pub. Date: Jul. 19, 2018

(65) Prior Publication Data
US 2019/0377343 A1    Dec. 12, 2019

(51) Int. Cl.
*G05D 1/00*         (2006.01)
*H04W 4/44*         (2018.01)
(Continued)

(52) U.S. Cl.
CPC .......... *G05D 1/0088* (2013.01); *B60W 30/06* (2013.01); *G06Q 50/30* (2013.01); *G08G 1/142* (2013.01); *H04W 4/44* (2018.02)

(58) Field of Classification Search
CPC . B62D 15/0285; B62D 15/025; B60W 30/06; G01C 21/3438; G06K 9/00805;
(Continued)

(56) References Cited

U.S. PATENT DOCUMENTS

2004/0260470 A1* 12/2004 Rast ..................... G06Q 10/083
                                                                  701/300
2015/0339928 A1* 11/2015 Ramanujam .......... G06Q 50/30
                                                                   701/23

(Continued)

*Primary Examiner* — Geepy Pe
*Assistant Examiner* — Paulo Roberto Gonzalez Leite
(74) *Attorney, Agent, or Firm* — Brandon Hicks; Eversheds Sutherland (US) LLP (57) ABSTRACT

A controller of an autonomous vehicle receives a travel itinerary of a passenger and an airport map. The controller then uses the airport map to arrive at a terminal corresponding to the passenger's travel itinerary. Upon arrival at the terminal the controller communicates with parked vehicles (V2V) or infrastructure to identify an unoccupied parking spot and then autonomously parks. When picking up a passenger, the controller determines whether the passenger has checked luggage and adjusts and arrival time accordingly and may account for the storage volume of the luggage. The controller may also loop a circuit at the airport where a wait time has been exceeded. In some embodiments, augmented reality may be used to help the passenger identify the vehicle.

16 Claims, 6 Drawing Sheets

(51) Int. Cl.
  *B60W 30/06*      (2006.01)
  *G06Q 50/30*      (2012.01)
  *G08G 1/14*       (2006.01)

(58) Field of Classification Search
  CPC .... G06K 9/00812; G06Q 10/02; G06Q 50/30; G08G 1/205; G08G 1/202; G08G 1/142; G05D 1/0088; H04W 4/44; H04W 4/025
  See application file for complete search history.

(56) References Cited

U.S. PATENT DOCUMENTS

| | | | |
|---|---|---|---|
| 2017/0108339 A1* | 4/2017 | Silverstein | G01S 5/0054 |
| 2017/0123423 A1* | 5/2017 | Sako | G05D 1/0088 |
| 2017/0197615 A1* | 7/2017 | Elie | B60W 30/06 |

* cited by examiner

PICKING UP AND DROPPING OFF PASSENGERS AT AN AIRPORT USING AN AUTONOMOUS VEHICLE

BACKGROUND

Field of the Invention

This invention relates to picking up and dropping off passengers using an autonomous vehicle.

Background of the Invention

Autonomous vehicles are becoming much more relevant and utilized on a day-to-day basis. One potentially difficult situation is dropping off and picking up a passenger at an airport. This is a common use case both for a transportation service and for a vehicle that is personally owned by the customer. An airport can be a very large area with many possible drop off and pick up locations.

The systems and methods disclosed herein provide an improved approach for operating an autonomous vehicle at an airport.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
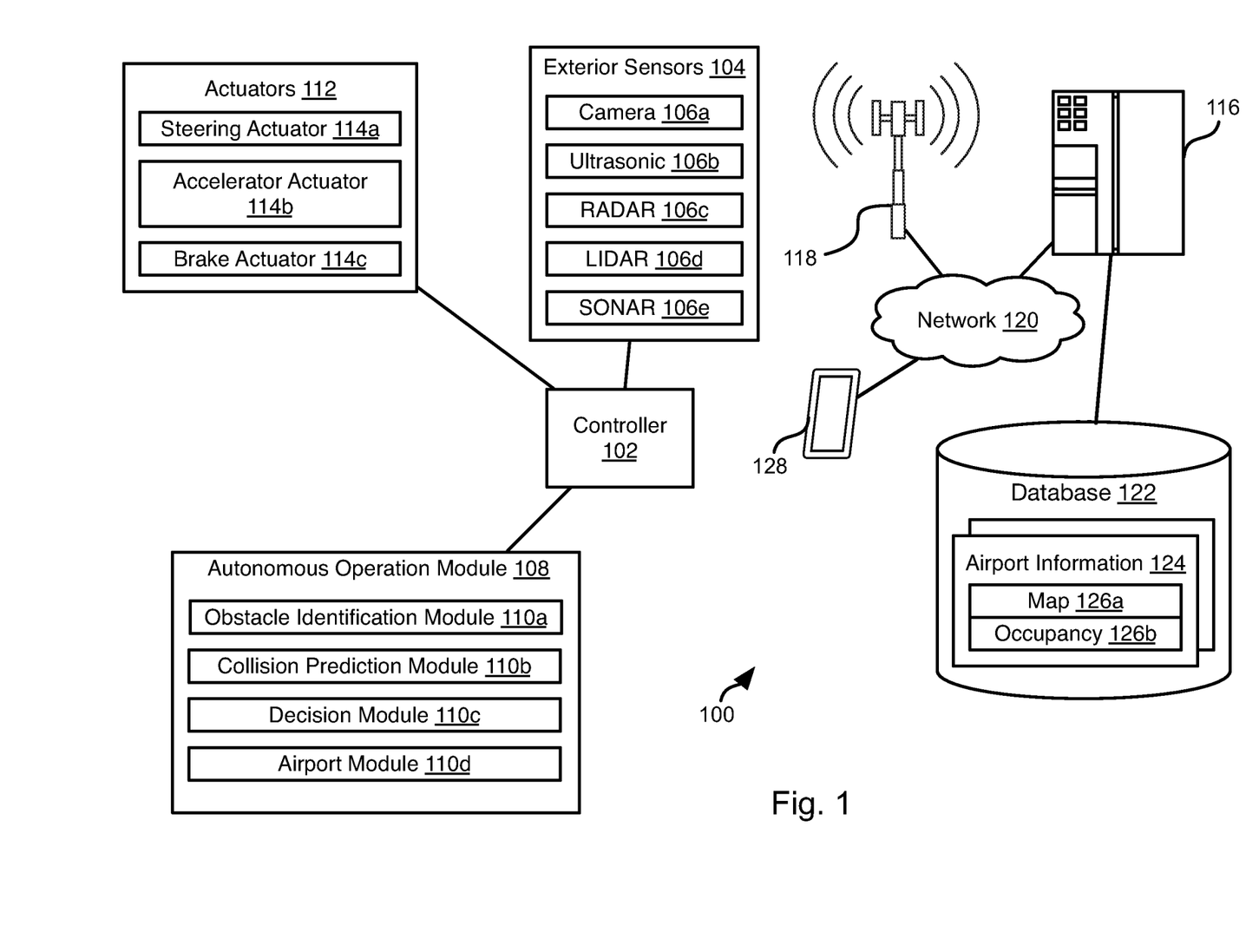
FIG. 1 is a schematic block diagram of components implementing a system in accordance with an embodiment of the present invention.

Referring to FIG. 1, the methods disclosed herein may be performed using the illustrated system 100. As discussed in greater detail herein, a controller 102 may perform autonomous navigation and collision avoidance for a vehicle housing the controller 102. The vehicle may have all of the structures and features of any vehicle known in the art including, wheels, a drive train coupled to the wheels, an engine coupled to the drive train, a steering system, a braking system, and other systems known in the art to be included in a vehicle.

The controller 102 may receive one or more outputs from one or more exterior sensors 104. For example, one or more cameras 106a may be mounted to the vehicle 100 and output image streams to the controller 102. The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art. The embodiments disclosed herein provide an approach for picking up and dropping off passengers at an airport. Accordingly, the autonomous operation module 108 may implement an airport module 110d implementing the methods described below.

The controller 102 may be in data communication with a server system 116. For example, the controller 102 may be in data communication with one or more cellular communication towers 118 that are in data communication with the server system 116 by way of a network 120, such as a local area network (LAN), wide area network (WAN), the Internet, or any other wireless or wired network connection.

The server system 116 may host or access a database 122. The database 122 may store airport information 124. The airport information 124 may be received from computer system of one or more airports or from another source of such information. In particular, airport information 124 for an airport may include a map 126a. The map 126a may be a detailed routable map of lanes, parking structures, terminals, etc. of the airport that may not be present in map data of a typical navigation system.

The airport information 124 may additionally include occupancy information 126b. As described in detail below, the location of unoccupied parking positions may be determined from outputs of cameras having a parking area in the field of view thereof. Accordingly, the occupancy information 126b for an airport may list the locations of one or both of unoccupied and occupied parking spots as reported by computer systems at the airport.

As described hereinbelow, a user may interface with the controller 102 by means of a mobile device 128, such as a mobile phone, tablet computer wearable computer. The functions ascribed herein to the mobile device 128 may also be performed by a desktop or laptop computer or any other type of computing device. In some embodiments, interfacing of the mobile device 128 may be performed directly with the controller 102 or by way of the server system 116 or some other intermediary computing device.

Figure 2:
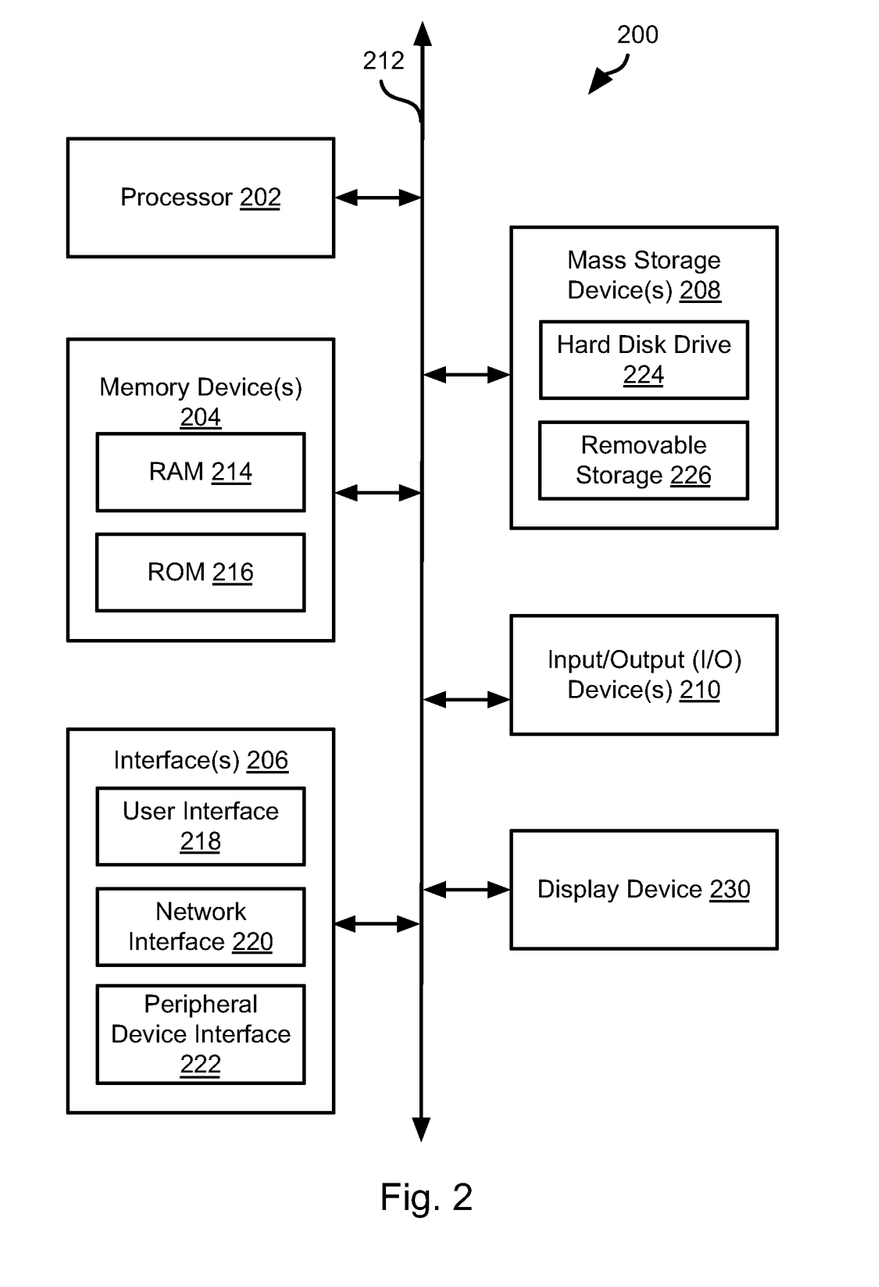
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102, server system 116, and mobile device 128 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
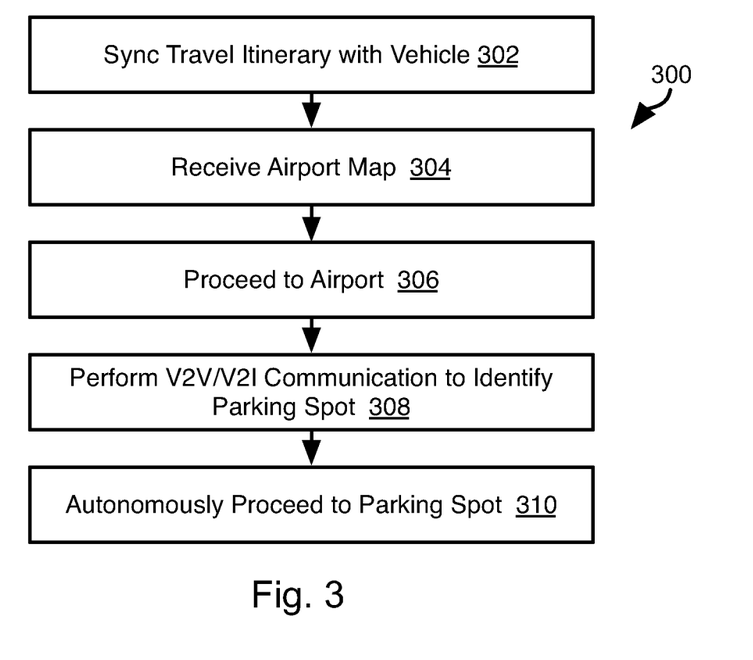
FIG. 3 is a process flow diagram of a method for dropping off a passenger at an airport in accordance with embodiments of the present invention.

Referring to FIG. 3, the illustrated method 300 may be executed by the controller 102 of a vehicle in order to drop off a passenger at an airport. Accordingly, the method 300 may be preceded by the vehicle navigating to a pickup location, e.g. the passenger's home, and subsequently navigating to the airport. The method 300 may begin execution prior to arrival at the airport.

The method 300 may include syncing 302 a travel itinerary of the passenger with the vehicle controller. This step may precede the passenger being picked up. For example, when requesting a ride, the passenger may provide the travel itinerary using the mobile device 128 to the server system 116, which then transmits the travel transmits some or all of travel itinerary to the vehicle. For example, the information provided to the vehicle at step 302 may include an identifier of the airport, a terminal of the airline with which the passenger is traveling, the passenger's pickup location, a departure time for the flight, a desired pickup time, or the like.

The travel itinerary may be obtained from an electronic representation of a boarding pass, the passenger's calendar, or other source of information. In some embodiments, the travel itinerary will be augmented with behavioral data. In particular, information for past trips to the airport may be stored. For example, the times of arrival at and departure from the airport may be stored, the terminal at which the passenger arrived or from which the passenger departed, the location where the passenger emerged from the airport, etc. In such embodiments, a pick up or drop off location may be selected from this behavioral data in combination with the travel itinerary. For example, by proceeding to a pick up or drop off location that has been selected by the passenger in the past when traveling with the same airline as a current trip.

The method 300 may include receiving 304 an airport map. For example, the server system 116 may transmit the map 126a for the airport referenced in the travel itinerary to the controller 102.

The controller 102 may then cause the vehicle to proceed 306 to the airport by way of the pickup location. Upon arriving at the airport, the controller 102 may then identify an unoccupied parking spot. For example, the controller 102 may perform 308 vehicle to vehicle (V2V) communication with one or more other vehicles.

Figure 4:
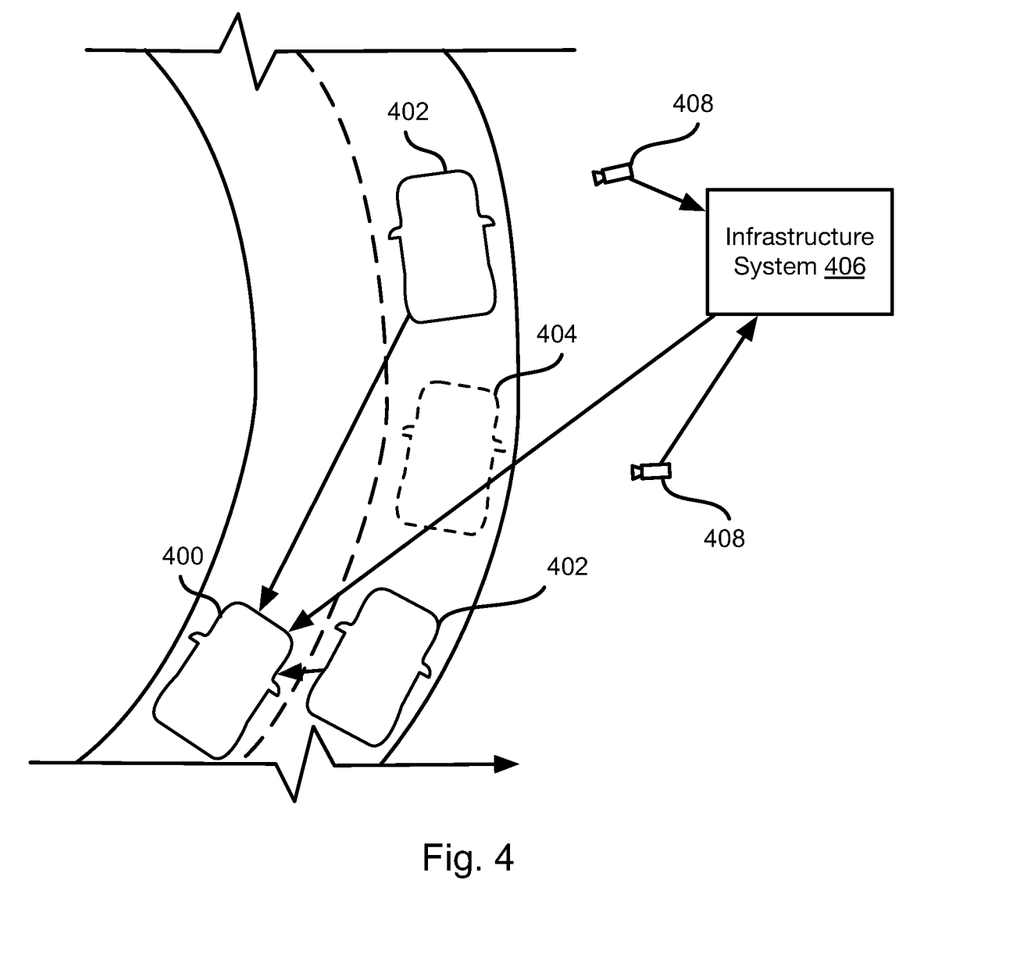
FIG. 4 illustrates a parking scenario at an airport in accordance with an embodiment of the present invention.

For example, as shown in FIG. 4, the vehicle 400 may communicate with one or more vehicles 402 in a parking area of the terminal referenced in the itinerary. For example, the vehicles 402 may report their locations to the vehicle 400. The controller 102 may then evaluate these reported locations with respect to the map data. Parking spots 404 indicated in the map data that do not correspond to the locations of the vehicles 402 may be determined to be candidate parking spots.

In other embodiments, step 308 may include receiving a location of an unoccupied parking position from an infrastructure computer system 406, e.g. vehicle to infrastructure (V2I communication). For example, the computer system 406 may be coupled to one or more cameras 408 having the parking area of the terminal in their fields of view. The infrastructure computer system 406 may analyze these images and identify an unoccupied parking spot 404, e.g. a parking spot where the surface of the parking area is visible and no vehicle is present. Alternatively, ultrasonic sensors, induction sensor, or other sensors may be mounted in or near parking spots and communicate to the infrastructure computer system 406 an output that indicates whether a vehicle is or is not present near the sensor.

The method 300 may then include autonomously proceeding 310 to the parking spot identified at step 308. This may include autonomously executing a parallel parking maneuver or any other parking maneuver known in the art. Step 310 may include detecting obstacles and performing collision avoidance with respect to detected obstacles.

Following exiting of the passenger from the vehicle, the vehicle may proceed to a next pick up location, which may be at the airport or elsewhere. Where the vehicle is personally owned by the passenger, the vehicle may proceed to a long term parking area and autonomously park, such as using the map data from step 304. Alternatively, the vehicle may return to the passenger's residence.

Figure 5:
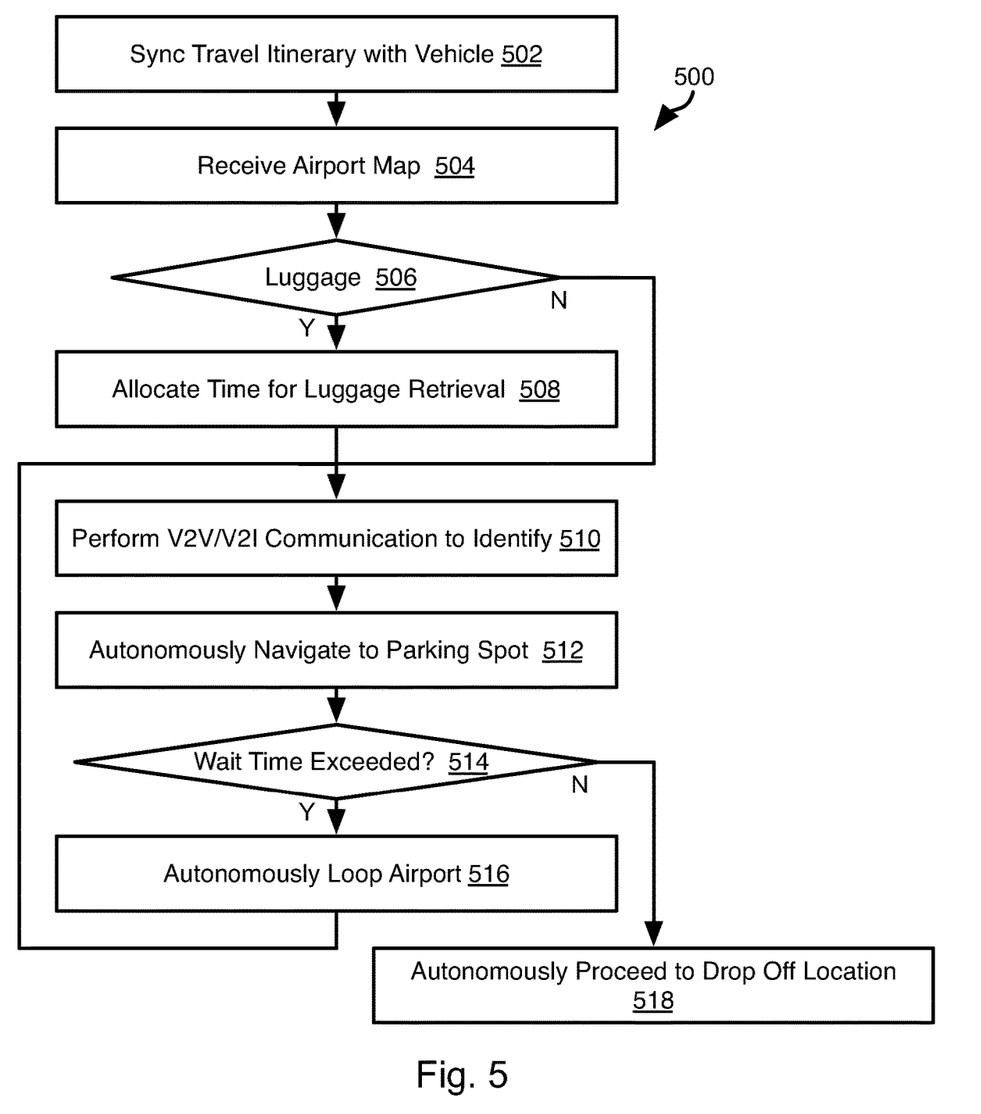
FIG. 5 is a process flow diagram of a method for picking up a passenger at an airport in accordance with embodiments of the present invention.

Referring to FIG. 5, the illustrated method 500 may be executed by the controller 102 when picking up a passenger at the airport. The method 500 may include syncing 502 with the server system 116 or the mobile device 128 of the passenger to receive a travel itinerary, such as in the same manner as for step 302 of the method 300. Likewise, the method 500 may include receiving 504 a map of the airport referenced in the itinerary in the same manner as step 304 of the method 300.

The method 500 may include evaluating 506 whether the passenger has checked luggage to pick up. This may include transmitting a query to the mobile device 128 of the passenger and receiving a response indicating whether or not the passenger has checked luggage. In other embodiments, the itinerary information received at step 502 indicated whether or not the passenger has checked luggage.

If the passenger is found 506 to have checked luggage, the method 500 may include allocating 508 time for luggage retrieval. For example, where the flight arrives at TA, the vehicle arrival time may bet set to be TA+TL, where TL is an estimated time for the passenger to retrieve luggage. The departure time of the vehicle to begin a trip to the airport may then be selected to be TA+TL−TR, where TR is an estimate of the transit time from the vehicle's current location.

The method 500 may further include identifying a parking spot at the terminal referenced by the itinerary and autonomously parking in the parking spot. This may include performing steps 510-512 in the same manner as steps 308-310 of the method 300.

The method 500 may further include evaluating 514 whether a wait time has been exceeded following parking at step 512 without the passenger entering the vehicle. If so, then the method 500 may include causing the vehicle to autonomously 516 loop a circuit at the airport. The circuit may be determined from the map data of step 504. Upon completing the loop and again approaching the terminal referenced in the itinerary, processing may continue at step 510.

If the passenger is found 514 to have entered the vehicle prior to expiration of the wait time following parking, the method 500 may include autonomously proceeding to a drop off location, e.g. residence, of the passenger. The drop off location may be included in the itinerary of steps 502 or received following the passenger entering the vehicle.

In other embodiments, steps 514, 516 may be omitted and the vehicle may wait in a waiting area, e.g. a "cell phone lot." The vehicle controller 102 may receive a location of the passenger from the mobile device 128 and proceed to the terminal only when the passenger's location is within some threshold distance of an area accessible by the vehicle, e.g. a passenger loading zone of the terminal. The location of areas accessible by the vehicle may be indicated in the map data received at step 504 or be determined from past airport pick up locations for the passenger.

Figure 6:
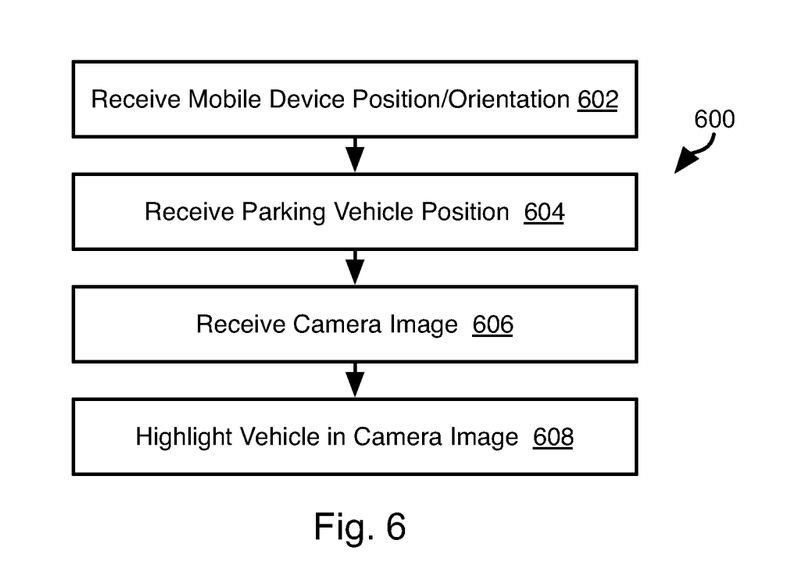
FIG. 6 is a process flow diagram of a method for assisting a passenger to identify an autonomous vehicle in accordance with embodiments of the present invention.

Referring to FIG. 6, a passenger may be provided a description of the vehicle to enable the passenger to find the vehicle at the airport. However, one or more additional techniques may be performed to enable the customer to arrive at the vehicle. For example, the controller 102 may transmit a GPS (global positioning system) coordinate of the vehicle to the mobile device 128, which then provides guidance to that coordinate.

In some embodiments, an augmented reality interface may additionally or alternatively be provided according to the method 600 to enable the passenger to identify the vehicle. The method 600 may be executed by the mobile device 128, such as by one or more processing devices of the mobile device 128 executing an application.

The method 600 may include receiving 602 the position and orientation of the mobile device 128, such as from one or more accelerometers and a GPS receiver of the mobile device 128. The method 600 may further include receiving 604 the location of the parked vehicle, e.g. the GPS coordinate of the parked vehicle.

The method 600 may further include receiving an image 606 from a camera of the mobile device 128. For example, the passenger may hold up the mobile device 128 having a parking area in the field of the view of the parking device 128 and the screen of the mobile device 128 visible to the passenger.

The method 600 may further include displaying the image on the screen of the mobile device 128 having the vehicle highlighted 608 in some way (outlined in a color, superimposed with a visible symbol, brightened or darkened relative to its surroundings, etc.). In particular, the position and orientation of the camera and the location of the vehicle may be used to identify the portion of the image corresponding to the vehicle. In particular, the highlighting may be performed according to any method known in the art of augmented reality (AR).

Figure 7:
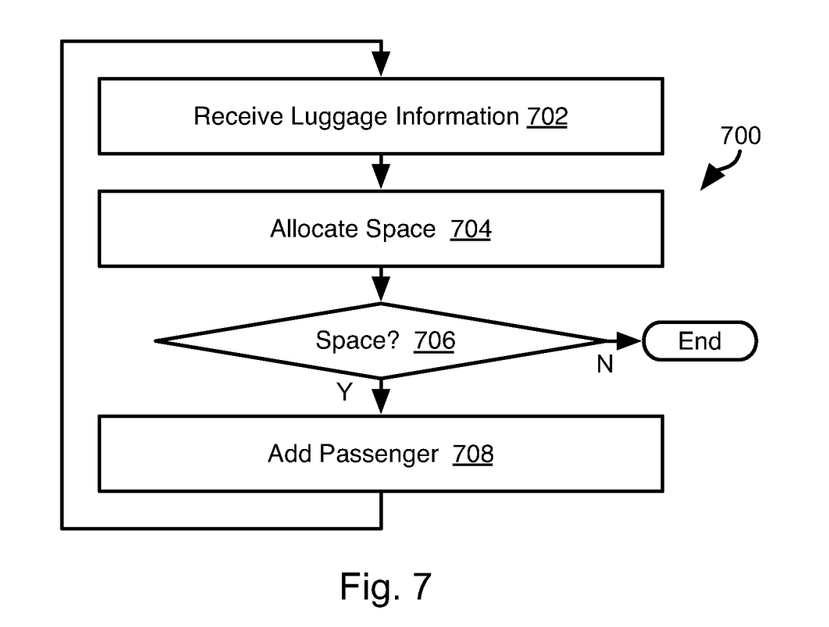
FIG. 7 is a process flow diagram of a method for accounting for luggage volume in accordance with an embodiment of the present invention.

Referring to FIG. 7, the illustrated method 700 may be executed by the controller 102 one or both of when picking up a passenger to drop off at the airport or when picking up a passenger at the airport. The method 700 may include receiving 702 luggage information for the passenger. For example, the passenger may input this information to an application executing on the mobile device 128, which then forwards this information to the controller 102. The luggage information may include a volume of the luggage and/or dimensions of the luggage, e.g. a height, width, and depth of a bounding cuboid for the luggage.

The method 700 may include allocating 704 space for the luggage and the passenger in the vehicle. For example, this may include decrementing a number of available seats by the number of passengers to be picked up and decreasing the cargo volume of the vehicle by the luggage volume.

The method 700 may then include evaluating 706 whether the remaining seats and cargo volume is sufficient for an additional passenger. For example, a requestor may submit a number of passengers and luggage information. If the number of passengers is less than or equal to the number of seats and the luggage information has a volume less than the remaining cargo volume, that passenger 708 may be added to the route of the vehicle, i.e. that passenger will also be picked up for drop off at the airport where the method 700 is executed in the context of the method 300 or will also be picked up at the airport if the method 700 is executed in the context of the method 500.

In some embodiments, both available volume and the dimensions of already added luggage and the dimensions of the luggage of the requestor may be evaluated to determine whether there is a storage arrangement that will permit the already added luggage and the requestors luggage to be placed in the storage area.

The method 700 may be repeated until step 706 is found to indicate that no other passengers can be added. Once the method 700 is finished, the passengers added at step 708 may be dropped off or picked up at the airport as described above with respect to FIGS. 3 and 5, respectively.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a controller of an autonomous vehicle:
   receiving an instruction to proceed to an airport, wherein receiving the instruction to proceed to the airport comprises:
      receiving a travel itinerary from a mobile device of a passenger;
      receiving an airport map from a server system;
      identifying a terminal according to the travel itinerary;
      receiving an instruction to pick-up the passenger at the airport;
      receiving an indication that the passenger has checked baggage;
      determining an arrival time from the travel itinerary; and
      adding a time adjustment to the arrival time in response to receiving the indication that the passenger has checked baggage to obtain a pickup time;
   causing the autonomous vehicle to proceed to the airport;
   receiving a location of an unoccupied parking spot at the airport; and
   autonomously parking the autonomous vehicle in the unoccupied parking spot,
   wherein causing the autonomous vehicle to proceed to the airport comprises causing the autonomous vehicle to proceed to the terminal, and wherein causing the autonomous vehicle to proceed to the airport comprises causing the autonomous vehicle to proceed to the airport effective to arrive by the pickup time.

2. The method of claim 1, wherein the indication that the passenger has checked baggage includes a volume of the checked baggage, the method further comprising: determining an available volume of the autonomous vehicle according to the volume of the checked baggage.

3. The method of claim 2, further comprising determining that the available volume is sufficient for an additional passenger;
   in response to determining that the available volume is sufficient for the additional passenger, causing the autonomous vehicle to proceed to a location of the additional passenger.

4. The method of claim 1, wherein receiving a location of the unoccupied parking spot comprises:
   receiving one or more notifications of one or more vehicles at the airport, the notifications including locations of the one or more vehicles; and
   identifying the unoccupied parking spot from map data for the airport and the locations of the one or more vehicles.

5. The method of claim 1, wherein receiving a location of the unoccupied parking spot comprises:
   receiving, from an infrastructure system at the airport, the location of the unoccupied parking spot.

6. The method of claim 5, further comprising:
   receiving, by the infrastructure system, one or more images from one or more cameras having a parking area in fields of view thereof; and
   identifying, by the infrastructure system, the unoccupied parking spot in the one or more images.

7. The method of claim 1, further comprising:
   evaluating an elapsed time since arrival at the unoccupied parking spot;
   determining that the elapsed time exceeds a threshold time; and
   in response to determining that the elapsed time exceeds the threshold time, autonomously driving the autonomous vehicle around a loop at the airport.

8. The method of claim 1, further comprising:
   receiving, by processing device of a mobile device, a location and orientation of the mobile device;
   receiving, by the processing device, a location of the autonomous vehicle;
   receiving, by the processing device, an image from a camera of the mobile device;
   identifying, by the processing device, a portion of the image corresponding to the autonomous vehicle according to the location and orientation of the mobile device and the location of the autonomous vehicle; and
   displaying, by the processing device, the image on a screen of the mobile device having the portion of the image highlighted.

9. A system comprising:
   an autonomous vehicle
   a controller housed in the autonomous vehicle, the controller programmed to:
      receive an instruction to proceed to an airport, comprising:
         receive a travel itinerary from a mobile device of a passenger;
         receive an airport map from a server system;
         identify a terminal according to the travel itinerary;
         cause the autonomous vehicle to proceed to the terminal;
         receive an instruction to pick-up a passenger at the airport;
         receive an indication that the passenger has checked baggage;
         determine an arrival time from the travel itinerary;

cause the autonomous vehicle to proceed to the airport, comprising:
add a time adjustment to the arrival time in response to receiving the indication that the passenger has checked baggage to obtain a pickup time; and
cause the autonomous vehicle to proceed to the airport effective to arrive by the pickup time;
receive a location of an unoccupied parking spot at the airport; and
autonomously park the autonomous vehicle in the unoccupied parking spot.

10. The system of claim 9, wherein the indication that the passenger has checked baggage includes a volume of the checked baggage;
wherein the controller is further programmed to calculate an available volume of the autonomous vehicle according to the volume of the checked baggage.

11. The system of claim 10, further comprising if the available volume is sufficient for an additional passenger, causing the autonomous vehicle to proceed to a location of the additional passenger.

12. The system of claim 9, wherein the controller is further programmed to:
receive one or more notifications of one or more vehicles at the airport, the notifications including locations of the one or more vehicles; and
identify the unoccupied parking spot from map data for the airport and the locations of the one or more vehicles.

13. The system of claim 9, wherein the controller is further programmed to receive, from an infrastructure system at the airport, the location of the unoccupied parking spot.

14. The system of claim 13, further comprising the infrastructure system programmed to:
receive one or more images from one or more cameras having a parking area in fields of view thereof; and
identify the unoccupied parking spot in the one or more images.

15. The system of claim 9, wherein the controller is further programmed to:
evaluate an elapsed time since arrival at the unoccupied parking spot;
if the elapsed time exceeds a threshold time, autonomously driving the autonomous vehicle around a loop at the airport.

16. The system of claim 9, further comprising a mobile device, the mobile device comprising a processing device programmed to:
receive a location and orientation of the mobile device;
receive a location of the autonomous vehicle;
receive an image from a camera of the mobile device;
identify a portion of the image corresponding to the autonomous vehicle according to the location and orientation of the mobile device and the location of the autonomous vehicle; and
display the image on a screen of the mobile device having the portion of the image highlighted.

* * * * *